United States Patent [19]
Levy

[11] Patent Number: 5,367,631
[45] Date of Patent: Nov. 22, 1994

[54] CURSOR CONTROL DEVICE WITH PROGRAMMABLE PRESET CURSOR POSITIONS

[75] Inventor: David H. Levy, San Jose, Calif.

[73] Assignee: Apple Computer, Inc., Cupertino, Calif.

[21] Appl. No.: 868,909

[22] Filed: Apr. 14, 1992

[51] Int. Cl.⁵ .......................................... G09G 1/100
[52] U.S. Cl. .................................. 395/162; 345/163; 74/471 X
[58] Field of Search ........................ 395/155, 162, 164; 345/153, 163, 119; 340/709, 710; 74/471

[56] References Cited

U.S. PATENT DOCUMENTS 5,260,696  11/1993  Maynard, Jr. ..................... 345/163

Primary Examiner—Robert L. Richardson
Attorney, Agent, or Firm—Richard C. Liu

[57] ABSTRACT

A method and apparatus for instantaneously and discontinuously moving the cursor in a computer system to any one of a plurality of user-selected screen positions is disclosed. In many known computer systems, a cursor control device known as a mouse is used to move and manipulate the position of the display's cursor. In a first preferred embodiment of the present invention, X- and Y-axis position sensing means are incorporated into the mouse's known electronics. A program correlates a plurality of X- and Y-axis mouse positions with a plurality of cursor positions on the display. When the computer user moves the cursor control device into any one of these programmed positions, the cursor on the display automatically moves to the predetermined position. In addition, less extreme motion of the mouse will result in a rate of cursor movement across the screen which increases linearly with the degree of tilt, up to the point where a predefined threshold is reached, at which time the cursor automatically and discontinuously jumps to the user's predefined screen location (s).

9 Claims, 2 Drawing Sheets

CURSOR CONTROL DEVICE WITH PROGRAMMABLE PRESET CURSOR POSITIONS

BACKGROUND OF THE INVENTION

This invention is in the field of digital computers. In particular, it relates to cursor control devices and their applications.

The use of a cursor control device, frequently called a "mouse", to position and move the cursor on the output display of a computer is well known. Typically, moving the display's cursor involves rolling the mouse across some surface. Sensors in the mouse detect the movement of the ball within the mouse and convert the electronic signals generated by the mouse into the appropriate movement of the display's cursor. The mouse, the electronics used to generate a signal indicative of the distance and direction that the mouse has moved, and the programming necessary to convert these motion signals into appropriate cursor movements are all known in the art.

Although the mouse has been supremely successful as a cursor control device, its ease of use being particularly noteworthy, there are some aspects of its use that could stand improvement.

For purposes of discussion, it is assumed that a mouse is being used with an Apple Computer, Inc. Macintosh computer. The software interface that is provided with this computer, as well as most programs designed to operate with this type of machine, are all manipulated through either various icons displayed on the computer or through alpha-numeric text that is presented to the user. Most of the icons and most of the alpha-numeric instructions appear in roughly the same place on the screen at all times and in different applications programs. Indeed, in the case of Apple's Mcintosh computer, the "Apple" icon always appears in the upper left hand corner of the display, the program selector always appears in the upper right hand corner, etc. In specific programs, certain icons are also placed in certain fixed positions (for example, the "point" tool in a draw program). Icons with fixed screen positions are accessed, on average, much more frequently than other screen icons. If the user is constantly having to move the cursor from a first icon or alpha-numeric message on the display to another icon or alpha-numeric message on the display, a great deal of time can be spent moving the cursor in the conventional manner of rolling it across its designated rolling surface, which is typically a small rubber pad. This time can become burdensome and can additionally lead to potential operator errors when the cursor is moved to the wrong icon or message, which is then accidentally selected. Although in common usage this problem is not frequently encountered at a level where user convenience is severely affected, it is nonetheless a burden in several types of operations that require constant use of the mouse. Removing motion repetition and redundancy would be very desirable in these operations.

Although the limitations on mouse use just described have been experienced by many users, only a few attempts have been made to correct them. One such attempt is a software correction known as "QuicKeys". Through this program, the user is allowed to define a series of keystrokes that will automatically move the cursor to a specific X,Y location or perform another user-specified task. Unfortunately, this solution is non-intuitive as it forces the user to remember another series of keystrokes and disassociates cursor motion from mouse motion of any kind. Indeed, when using "QuicKeys", the user must type the predefined series of key strokes and then still reach for the mouse in order to "click" it. This software solution is obviously not very desirable.

Additionally, the inventor is unaware of any hardware solution which permits the computer user to move the cursor between any desired set of points, the points being selected by the user, without the necessity of moving the cursor across the screen.

SUMMARY OF THE INVENTION

The present invention, in a first preferred embodiment, comprises a cursor control device with a tilt sensitive sensor incorporated therein. A simple program is incorporated into the user's computer system which correlates the tilting of the mouse in a particular direction with a particular location on the computer's display. After the initial programming, the user need only tilt the mouse in the preset direction for the cursor to move immediately to the designated location. As the incorporation of the sensor and its supporting electronics can be done at very minimal cost, adding this new capability to known cursor control devices is relatively simple and inexpensive.

The same sensor and electronics that allow automatic cursor movement to specific screen locations could also be used in an analog manner. The sensors which comprise the first preferred embodiment of the present invention are highly sensitive. Given 8-bit output, a 0° to 90° tilt can be mapped with a resolution of $\frac{1}{3}$ of 1°. This resolution allows for many analog cursor applications such as scrolling at various rates.

A first preferred embodiment of the present invention will now be described with reference to the figures listed and described below.

DETAILED DESCRIPTION OF THE PREFERRED EMBODIMENT

Figure 1:
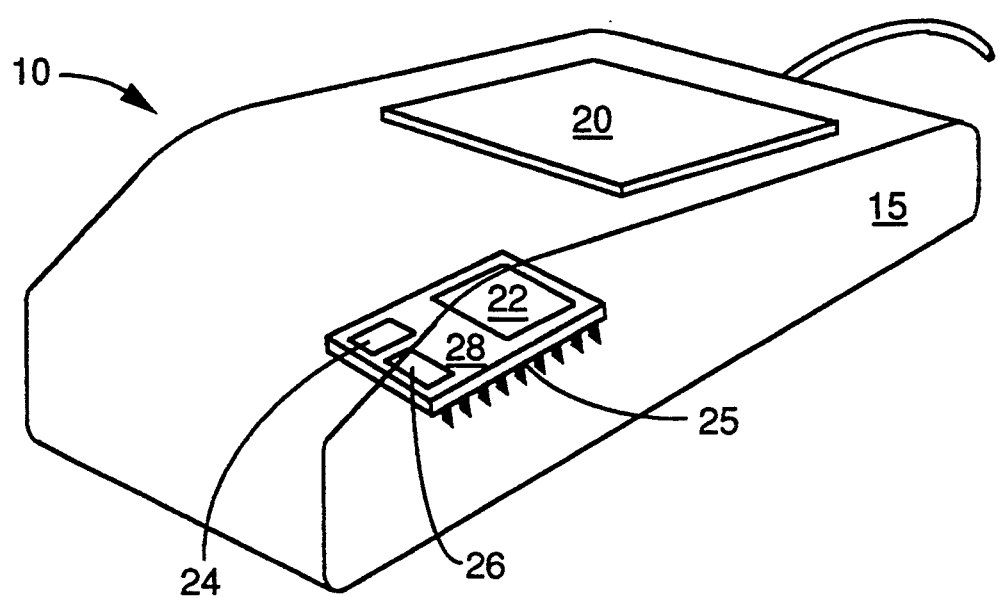
FIG. 1 shows a first preferred embodiment of the present invention.

FIG. 1 shows a first preferred embodiment of the present invention as it would be incorporated into a known cursor control device such as a typical "mouse". Mouse 10 is comprised of housing 15, input button 20, input electronics 25, which is further comprised of ball position sensing electronics 22, Y-axis and X-axis tilt sensors 24 and 26 and tilt position electronics 28. Such known parts of a mouse such as its ball and its supporting structure are not illustrated herein as they comprise no portion of the patentable subject matter of the present invention.

Input electronics 25 is a specially designed application specific integrated circuit ("ASIC"). The portion of the ASIC which forms the ball position sensing electronics 22 is known, commercially available and requires no further discussion here.

X- and Y-axis tilt sensors 24 and 26 are formed, in the first preferred embodiment, from magneto-transistors. Electrons moving through a magnetic field have a force which is orthogonal to the field and to the axis of motion. The magnitude of the force on the electrons is proportional to the magnitude of the field, which is determined by the angle of the primary axis of the sensor with respect to the axis of the field. When the primary axis of the sensor is parallel to the field, the electrons have no imposed force as there is no tilt. When the axis of the sensor is perpendicular to the field, maximum force is generated as the tilt is 90°. Utilizing these physical facts, each magneto-transistor comprises an electron injector and an electron receiver. The injector shoots a known quantity of electrons at the receiver. The ambient magnetic field perpendicular to the electron motion deflects the electrons in an amount proportional to the strength of the field, resulting in a proportional variation in the number of electrons detected at the receiver. Such magneto-transistors are known and will soon be commercially available. In the present invention, the two magneto-transistors necessary could both be easily fabricated on a small amount of the die area available in a custom ASIC. In even their lowest cost realizations, two such magneto-transistors with appropriate electronics can easily distinguish 1° of resolution along eight compass points (N, NE,E, SE,S, SW, W, and NW). In the preferred embodiment, tilt position electronics 28 receives the signals generated by the X- and Y-axis tilt sensors and generates the appropriate signal indicating the direction of the mouse's tilt for use by the computer to which the present invention is coupled.

Figure 2:
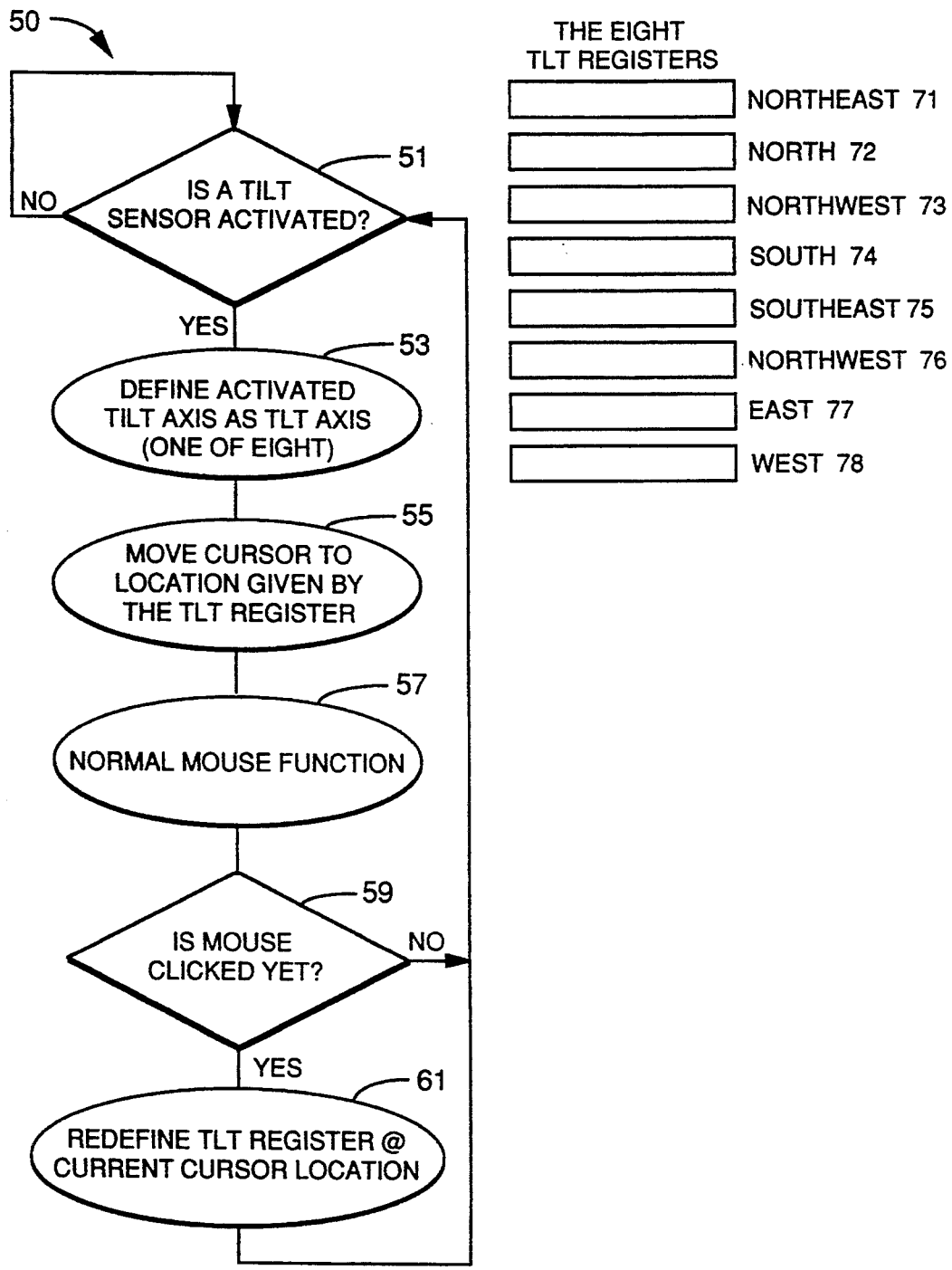
FIG. 2 is a flow chart showing the programming and use of the first preferred embodiment of the present invention.

Use of the present invention would be particularly simple and convenient. A flow chart of the present invention's use is shown in FIG. 2. Flow chart 50 begins at step 51, where the system checks the tilt sensor to see if it has been activated. If it has not been activated, the system simply repeats the test. If it has, the activated tilt axis is defined as one of the eight TLT registers listed and numbered as 71 through 78. After the tilt axis has been assigned a tilt register, the user moves the cursor to the location he or she wishes to associate with that particular tilt register at steps 55 and 57. At step 59, the system checks to see if the mouse has been clicked yet. If it has not been clicked, the system returns to step 51. If it has, then, at step 61, the cursor position chosen by the user is stored in the system in relation to the selected tilt register Now, whenever the user tilts the mouse in the selected compass direction, the cursor will automatically jump to the chosen position.

In use, the user merely tilts the mouse in the same direction used to initially program it for the particular icon or information the user now desires to access and the cursor automatically moves, at step 55, to the desired location. The mouse and its sensors can be reprogrammed at any time. It should be noted that it would be possible to program the mouse so that tilting it in one particular direction would be the functional equivalent of clicking the mouse's select button.

Although magneto-transistors were chosen for the first preferred embodiment, nothing herein should be taken to limit the present invention to the use of these transistors only. At the most expensive and complex end, gyroscopes could of course be substituted. Mercury slide switches or reed switches could be used, although inertia reduces their sensitivity and they are not programmable. Additionally, mercury slide switches are toxic. A possible viable alternative are electrolytic tilt sensors, currently about 0.75 cubic inches and costing $80, which may become both small enough and inexpensive enough to compete with magneto-transistors in this application. An electrolytic sensor is a variable potentiometer whose resistance varies as more or less of a constant current passes through varying amounts of the electrolyte. The amount of the electrolyte between the sensor's contact points varies as the sensor is tilted. Unfortunately, electrolytic sensors require A.C. power to avoid damage to the sensor. At present, the very low cost of adding tilt detection to ball sensing circuitry using magneto-transistors, the cost being estimated at $0.50 for each mouse, dictates their use in this application.

It is also possible to use the present invention in an analog rather than digital fashion. For example, the magneto-transistors which comprise the X- and Y-axis sensors in the first preferred embodiment, are extremely sensitive. Typically, they can provide tilt resolution of ⅛ of 1°, when the data output comprises 8 bits. Given this resolution, variable rate analog scrolling can be easily incorporated into the present invention. In this application, scrolling through a text document could be done at a linearly varying rate as the mouse incorporating the present invention was tilted through an increasingly large angle. In this application, the greater the angle of tilt, the faster the computer scrolls through the text. Other analog applications could include computer vehicle and aircraft simulators and games. In both areas, the sensitivity and increasing rate of cursor movement should be very useful.

The present invention has now been described in detail, in the context of one specific embodiment. Nothing herein should be taken to limit this invention to the particular embodiment discussed. For example, with straightforward modifications to the X- and Y-axis sensing circuitry, more than eight compass points could be used as reference points for cursor movement. With appropriate programming, the user could also eliminate the need to actuate the mouse's select button by tilting the mouse in a predefined direction and having this tilt input serve the same function as pressing the button. Also, as discussed above, variable rate analog cursor movement is easily realized using the present invention. Given these possibilities, this invention should not be considered in a narrow, restrictive sense, but rather in a broad, expansive sense.

What is claimed is:

1. In a computer system having a central processing unit, a display coupled to the central processing unit, a cursor which is displayed on the display and indicates the location where next display data will be located, and a cursor control device for moving the cursor across the display, an apparatus for moving the cursor to selected positions on the display automatically, the apparatus comprising:
X- and Y-axis sensing means mounted within the cursor control device;
X- and Y-axis position correlating means coupled to the X- and Y-axis sensing means for receiving the X- and Y-axis position signals generated by the X and Y-axis sensing means and generating an X- and Y-axis position signal;
memory means for storing a given X- and Y-axis position signal in relation with a user selected cursor display position, the memory means being coupled to the X- and Y-axis position correlating means, the cursor moving to the user selected display position automatically when the cursor control device is subsequently moved into the X- and Y-axis position associated with that display position stored in the memory means.

2. A method for automatically moving a display cursor to a user-selected position in a computer system having a display, a display cursor, and a display cursor control means, the method comprising the steps of:

detecting a first X-axis position of the display cursor control means;

detecting a first Y-axis position of the display cursor control means:

relating the first X- and Y-axis positions with a user-selected display cursor position on the display and storing the relation in a first memory means, the display cursor subsequently moving to the user-selected display cursor position each time the display cursor control means is tilted to the first X- and Y-axis position; and repeating the detecting steps and relating steps until a predetermined number of positions have been related to a predetermined number of display cursor positions.

3. The apparatus of claim 1 wherein the X- and Y-axis sensing means comprise magneto-transistors.

4. The apparatus of claim 1 wherein the X- and Y-axis sensing means comprise electrolytic sensors.

5. In a computer system having a display with a cursor, a variable rate cursor movement control device comprising:

X-axis tilt sensor means;

Y-axis tilt sensor means;

X- and Y-axis tilt measurement means coupled to the X- and Y-axis tilt sensor means for measuring the degree of tilt in both the X- and Y-axis; and processor means coupled to the X- and Y-axis tilt measurement means and the cursor for moving in both the X- and Y- axis at a rate which increases as the degree of tilt along that axis increases.

6. The variable rate cursor movement control device of claim 5 wherein the processor means further automatically and instantaneously moves the cursor to a predefined location on the display when the degree of tilt along either or both axis exceeds a predefined amount.

7. The variable rate cursor movement control device of claim 6 wherein the X- and Y-axis tilt sensor means comprise a pair of magneto-transistors.

8. The variable rate cursor control device of claim 6 wherein the X- and Y-axis tilt sensor means comprise a pair of electrolytic sensors.

9. The variable rate cursor movement device of claim 6 wherein the device has a select button with a select function that is activated when the select button is depressed and wherein a user defined tilt input activates the same function as depressing the select button.

* * * * *